THOMAS STUMM.
Improvement in Churns.
No. 128,080.          Patented June 18, 1872.
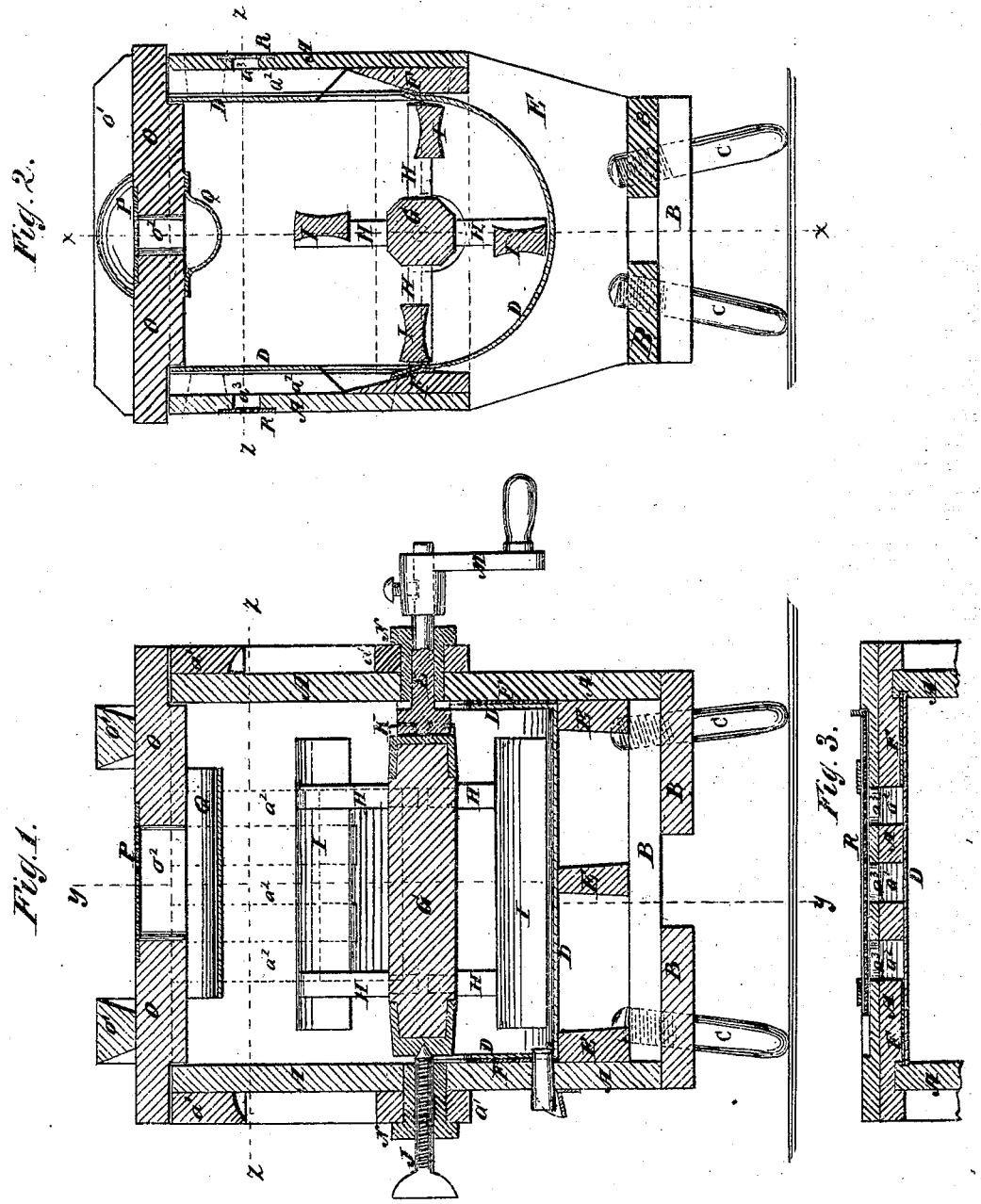

128,080

UNITED STATES PATENT OFFICE.

THOMAS STUMM, OF ADA, OHIO.

IMPROVEMENT IN CHURNS.

Specification forming part of Letters Patent No. 128,080, dated June 18, 1872.

Specification describing a new and useful Improvement in Churns, invented by THOMAS STUMM, of Ada, in the county of Hardin and State of Ohio.

Figure 1 is a detail vertical longitudinal section of my improved churn taken through the line $xx$, Fig. 2. Fig. 2 is a detail vertical cross-section of the same taken through the line $yy$, Fig. 1. Fig. 3 is a detail horizontal section of one side of the churn taken through the line $zz$, Figs. 1 and 2.

Similar letters of reference indicate corresponding parts.

The invention consists in forming apertures on each side of the body of a rotary churn, so that there may be provided a circulation of pure air through the same.

A is the box of the churn, having the base-frame B; and C are the legs, screwed into the base-frame B. The churn is lined with a metallic sheet, D, while the bottom is supported upon blocks E secured to the base-frame B. F is a canvas lining of the said churn-body A. G is the dasher-shaft, to which are attached four pairs of arms, H, to which are attached wings I. The churn is provided with the dasher-shaft G, a center screw, J, the clutch K, and the crank M. The center screw J and journal L pass through stuffing-boxes N to prevent leakage. The ends of the churn-body A are strengthened by cross-bars $a^1$. O is the cover, having slots $o^2$, covered with wire-guaze, and strengthened by cross-bars $o^1$ attached to its upper side, and which have grooves or notches formed in the side edges of their middle parts. Q is a sheet-metal strip-cover, left open at the ends, to prevent the milk from splattering out through said slot. In the sides of the churn-body A are formed grooves or channels $a^2$, extending from, at or near their upper edges, to about the point where the wings I leave said sides in their revolution, at which point their inner ends open into the interior of the churn through slots in the zinc lining D. The upper parts of the channels $a^2$ are connected with the exterior of the churn by holes, $a^3$, as shown in Figs. 2 and 3. The outer ends of the holes $a^3$ are covered with slides, R, which have holes corresponding in size and position with the holes $a^3$, formed in them, and covered with wire-gauze or perforated sheet metal, so that the air may be admitted or excluded, as may be desired, by simply adjusting the said slides P.

What I claim is—

The grooves or channels $a^2$ $a^3$, formed in the sides of the box A of the churn-body, constructed and arranged in connection with a rotary dasher, as and for the purpose set forth.

THOMAS STUMM.

Witnesses:
J. O. KELLER,
F. B. HOLLAND.